United States Patent [19]

Assh

[11] Patent Number: 5,025,877
[45] Date of Patent: Jun. 25, 1991

[54] LOAD DISTRIBUTION SYSTEM FOR ROAD VEHICLES HAVING WHEEL AXLES SUPPORTED BY PNEUMATIC SUSPENSION

[76] Inventor: Daniel Assh, 1155 Turnball, Apt. 715, Quebec City, Canada, G1R 5G3

[21] Appl. No.: 383,012

[22] Filed: Jul. 21, 1989

[51] Int. Cl.⁵ .............................................. B62D 61/12
[52] U.S. Cl. .................................. 180/24.02; 180/209; 280/704
[58] Field of Search ..................... 180/24.02, 209, 290, 180/DIG. 906; 280/104, 680, 682, 704, 707, 712, 678, DIG. 1; 177/137

[56] References Cited

U.S. PATENT DOCUMENTS

| | | | |
|---|---|---|---|
| 2,902,289 | 9/1959 | North | 180/24.02 |
| 4,042,049 | 8/1977 | Reichow et al. | 177/137 |
| 4,141,430 | 2/1979 | Eddy, Jr. | 180/24.02 |
| 4,449,733 | 5/1984 | Iida et al. | 280/707 |
| 4,700,968 | 10/1987 | Cherry | 280/704 |
| 4,789,038 | 12/1988 | Nguyen et al. | 180/24.02 |
| 4,854,409 | 8/1989 | Hillebrand et al. | 180/24.02 |

Primary Examiner—Charles A. Marmor
Assistant Examiner—Tamara L. Finlay
Attorney, Agent, or Firm—Foley & Lardner

[57] ABSTRACT

A load distribution system for a road vehicle comprises a main wheels suspension which is preferably the steering wheels suspension and an auxiliary wheels suspension. The system includes air-inflatable balloons in the auxiliary suspension and an air compressor to feed the balloons. A weight sensor constantly measures the weight carried by the main suspension and sends corresponding signals to a computer. The system further comprises a control assembly for the auxiliary suspension constructed to receive pressure air from the compressor and feed it to the auxiliary suspension balloons. The control assembly is connected to the computer which is programmed to respond to the weight variations by correspondingly adjusting the pressure in the balloons of the auxiliary suspension in order to let the auxiliary suspension carry any extra weight which exceeds a preselected maximum weight to be carried by the main suspension.

20 Claims, 2 Drawing Sheets

LOAD DISTRIBUTION SYSTEM FOR ROAD VEHICLES HAVING WHEEL AXLES SUPPORTED BY PNEUMATIC SUSPENSION

BACKGROUND OF THE INVENTION

1. Field of the invention

The present invention relates to a system for use on a load transportation vehicle, having an auxiliary axle with a suspension of the pneumatic type, which system is capable of automatically and accurately distributing the load to be carried by the vehicle between at least one of the main axle, preferably the front one, and the auxiliary axle, whenever the latter is needed.

2. Description of the prior art

Vehicles to which the invention particularly applies are those equipped with retractable auxiliary wheels between the front steering wheels and the rear wheels; the auxiliary retractable wheels being intended to carry a surplus load when brought to ground-engaging position. Both suspensions for the steering wheels and for the auxiliary wheels include inflatable balloons either exclusively or in combination with spring blades.

As is known, it is of prime importance that the steering wheels not be overloaded or underloaded at any time so that the driver may be able constantly to control steering of the vehicle properly. This is particularly so whenever the vehicle carries a surplus load at which time the auxiliary wheels have to be used and the load distributed so that the steering wheels are neither overloaded or underloaded. Apart from difficulties in driving, the driver may be penalized, at a load-measuring station along the road, for having an overloaded axle.

At the present time, it is possible for the vehicle driver to inflate or deflate the suspension balloons manually to try to reach the best possible load distribution between the steering and auxiliary wheels, but this can only be done manually, as aforesaid. There is indeed absolutely no way for him to assess with any accuracy whether or not the load distribution has been done properly except by means of his own experienced perception of the vehicle behaviour as sensed through the steering column. It will be appreciated that such an adjustment is quite subjective and therefore may lead to dangerous situations, not to mention rendering driving more difficult.

SUMMARY OF THE INVENTION

An object of the invention is consequently to provide a load distribution system wherein the distribution can be made fully automatically and with accuracy, the driver having no part to play in the operation.

With this object in view, the invention proposes a load distribution system for a road vehicle, which system comprises a main suspension and an auxiliary suspension including air-inflatable balloons fed by an air compressor. A weight sensor constantly measures the weight carried by the main suspension and sends corresponding signals to a programmed computer. The system further comprises a control assembly for the auxiliary wheels suspension constructed to receive pressurized air from the compressor and feed it to the auxiliary suspension balloons. The control assembly is connected to the computer which is programmed to respond to the weight variations by correspondingly adjusting the pressure in the balloons of the auxiliary suspension in order to let the auxiliary suspension carry any extra weight which exceeds a preselected weight to be carried by the main suspension.

Preferably, the main suspension is the front wheels suspension. Preferably also, the control assembly comprises an air pressure controller operatively connected to the balloons of the auxiliary suspension, to the computer and to the air compressor for feeding pressure air to the balloons under control of the computer.

The control assembly may also include lifting and lowering means for moving the wheels of the auxiliary suspension between a ground-engaging position of the wheels and a retracted position.

According to a particular feature of the invention, means are also proposed for feeding pressure air to the air brakes of the auxiliary wheels up to a given pressure that is proportional and preferably equal to the pressure of the air fed to the balloons of the auxiliary suspension. In this manner, the pressure applied by the driver on the air brakes of the auxiliary suspension can never exceed that corresponding to the load carried by the wheels of the auxiliary suspension.

A description now follows of a preferred embodiment of the invention having reference to the appended drawings.

DESCRIPTION OF A PREFERRED EMBODIMENT

Figure 1:
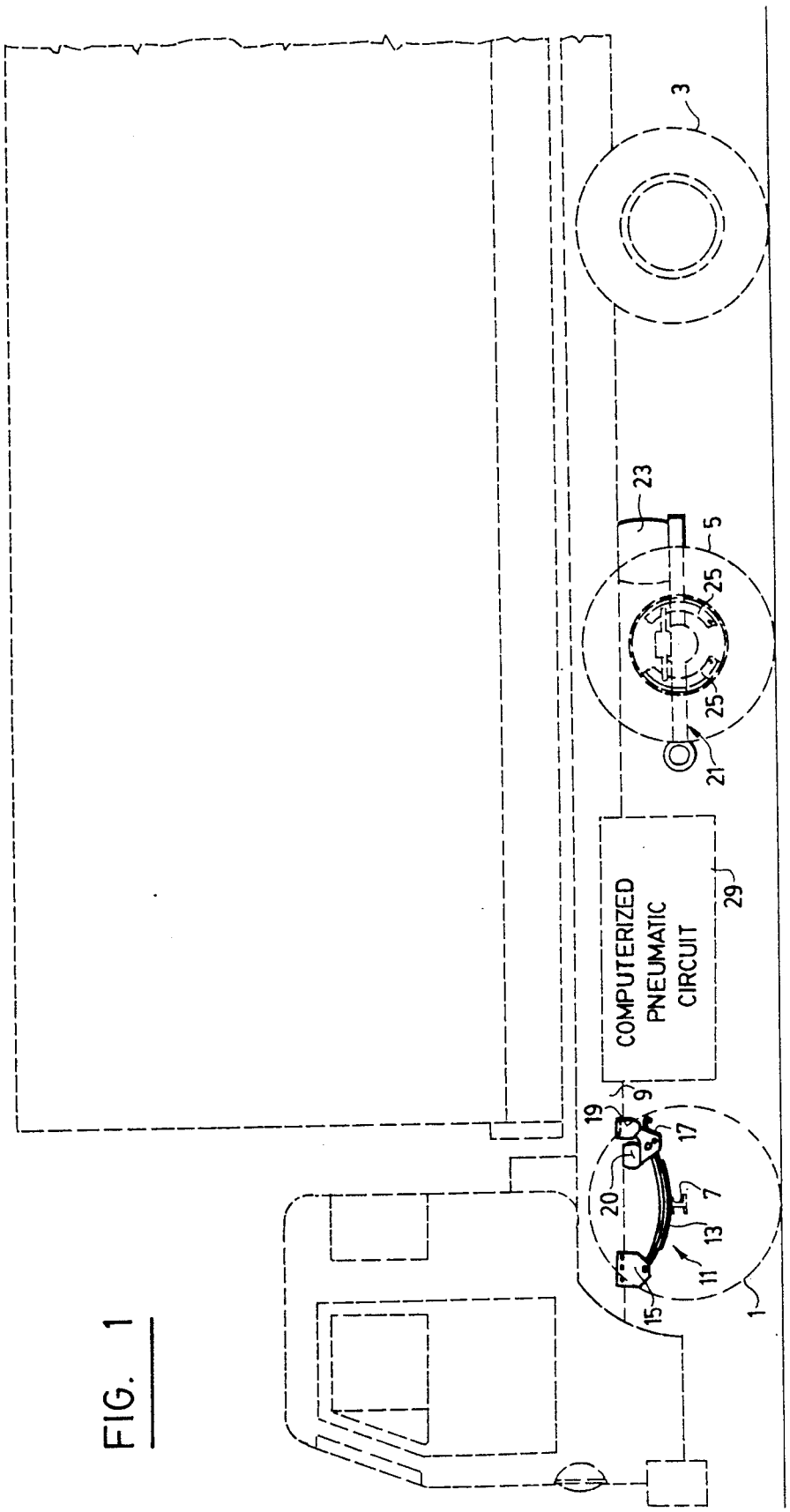
FIG. 1 is a side elevation view of a load transportation vehicle provided with a load-distribution system made according to the invention.

Referring to FIG. 1, there is shown a truck having front steering wheels 1, rear wheels 3 and retractable auxiliary wheels 5 between the front and rear wheels, the auxiliary wheels being intended for carrying any load in surplus of the usual load carried by the truck and borne by the front and rear wheels.

The steering wheels 1 are mounted on a transverse axle beam 7 connected, at its ends, to a frame beam 9 of the truck by means of a pair of like suspensions 11 which may be conventional as long as it includes pneumatic balloons. Rear wheels 3 are mounted on the front beam 9 in a similar manner but need not include pneumatic balloons.

The front suspensions 11 shown in FIG. 1 are of the combined pneumatic and blade-spring type such as disclosed in Applicant's copending application Ser. No. 07/349,107, filed on May 9, 1989. The one illustrated in FIG. 1 comprises a blade spring 13 fixed to the axle beam 7 and pivoted at one end to a bracket 15 of the adjacent frame beam 9. The other end is slidably received in a lever 17 pivoted at one end to a bracket 19 and fixed, at its other end, to an inflatable air balloon 20 secured to and beneath the frame beam 9.

Each auxiliary wheel 5 is similarly mounted on the beam 9 of the truck body frame through a suspension 21 of a conventional type including an air inflatable balloon 23 and air brakes 25. The suspensions 21 further include conventional lifting and lowering means 27 (FIG. 2) capable of moving the wheels 5 between a ground-engaging position and a retracted position. Such means 27 can be pneumatic and part of the system of the invention or hydraulic and connected to the hydraulic circuitry of the truck.

Figure 2:
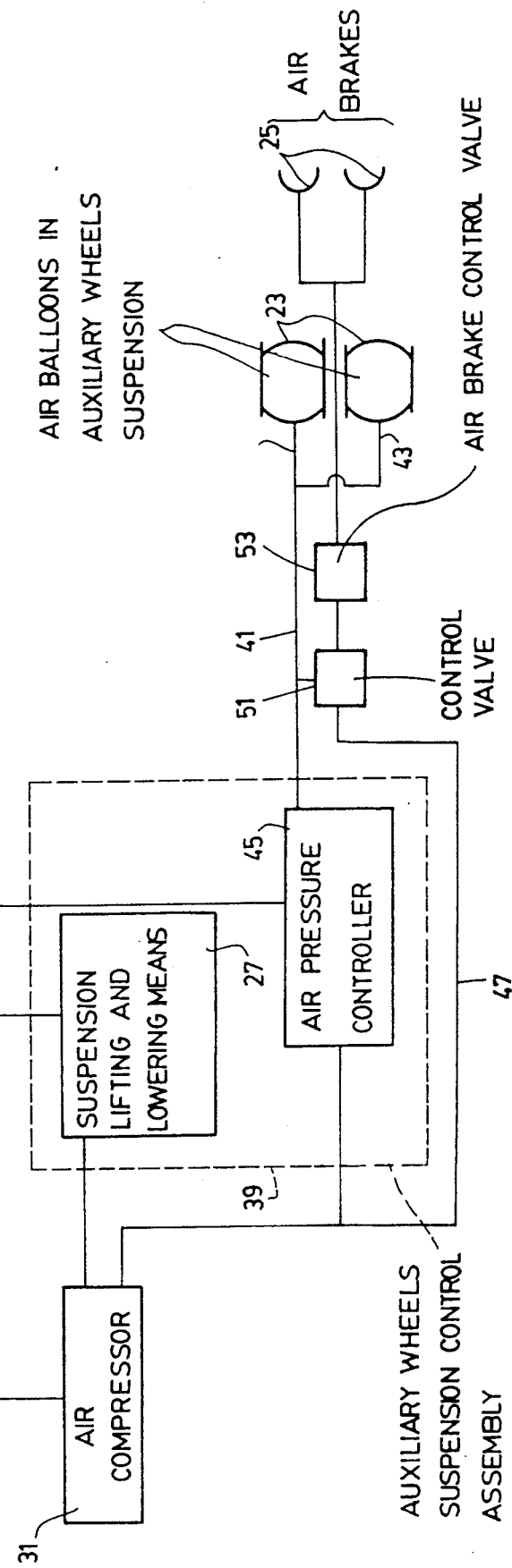
FIG. 2 is a block diagram of the system.

A computerized pneumatic circuit 29 connected to the front and auxiliary suspensions 11, 21, integrates the various components of the load distribution system, as made according to the invention and illustrated in FIG. 2 to which reference is now made.

As shown, an air compressor 31 sends pressurized air to the balloons 20.

A weight sensor 37 operatively connected to all of the balloons 20 and to the computer 35 constantly assesses the weight supported by the steering-wheels suspension. It may include a conventional pressure gauge capable of measuring the air pressure in the balloons 20 or it may include a ruler device measuring the linear lag or deflection of the suspension. It may also include sensor means for evaluating the effective load and calculating its distribution over the axles. In all cases, the measurements made are directly proportional to the weight supported by the steering-wheels suspension 11 and are transformed into corresponding weight signals sent to the computer 35 which compares them to the preselected weight, acceptable to the steering wheels; the computer establishing weight variations from these signals with respect to the acceptable weight.

The system in FIG. 2 further comprises an assembly 39 for controlling the action of the auxiliary-wheels suspension 21. It is operatively connected to the computer 35, to the air compressor 31, and to the balloons 23 of the auxiliary-wheels suspension through pipings 41, 43. It is constructed for receiving pressure air from the air compressor 31 and for feeding it to the balloons 23. The computer 35 is programmed for responding to the weight variations in the balloons 20 by correspondingly adjusting the pressure in the balloons 23 in order to maintain constant the preselected weight to be carried by the steering wheels 1 of the suspension 11. For this purpose, the control assembly has an air pressure controller 45 which is operatively connected to the balloons 23, through pipings 41, 43, so as to transfer, under the control of the computer 35, pressurized air to the balloons 23 at a pressure commensurate to the weight variations in the balloons 20.

The control assembly 39 additionally comprises the aforesaid means 27 for lifting and lowering the auxiliary wheels 5 between a ground-engaging position and a retracted position as aforesaid. Where these means, which could involve power jacks, are pneumatic, they are connected to the air compressor 31 and to the computer 35 for complete computer-controlled operation. They may, on the other hand, be hydraulically operated and be part of the hydraulic circuit of the vehicle.

Where the means 27 are pneumatic and a surplus load is detected on the steering wheels by the weight sensor 37, the computer orders their actuation to apply the auxiliary wheels to the ground and pressurized air to be sent to the balloons 23, which, by their inflation, lift the vehicle so that the auxiliary wheels 5 gradually pick up the surplus load thereby gradually reducing the load on the steering wheels 1 until the preselected load thereon is reestablished. In this manner, the computer 35 is able constantly to keep the load on the steering wheels at the preselected weight by shifting any overload thereon to the auxiliary wheels. There is no longer any need for the driver to make approximate and hazardous adjustments.

Let us assume, for instance, that the proper load, for good driving condition, to be supported by the steering wheels corresponds to a pressure of 80 psi in the balloons 20. Suppose now that a surplus load is added which brings the total load to an equivalent of 145 psi, which load is distributed to all wheels including the steering wheels 1 and the rear wheels 3. The steering wheels 1 are thus overloaded. The sensor 11 then sends signals to the computer 35 which orders actuation of the control assembly 39 causing the means 27 to lower the auxiliary wheels 5 to the ground and inflation of the balloons 23. As the latter lifts the vehicle, the auxiliary wheels 5 gradually pick up part of the surplus load, reducing, by the same token, the load applied to the front wheels 1 until the load on them is finally reduced to the acceptable one corresponding to 80 psi in the balloons 20. Any further addition of load on the steering wheels over the acceptable one is immediately removed from them by corresponding inflation of the balloons 23.

As an added feature, the system of the invention may provide for supplying air to the air brakes 25 at a pressure that is always proportional to the one corresponding to the load carried by the auxiliary wheels to prevent freezing of the brakes and skidding of the vehicle. For this purpose, and as shown in the embodiment of FIG. 2, a control valve 51 is connected to the piping 41 to receive air from it which will be at the same pressure as that in the balloons 23. This valve 51 is mounted in line onto a pressurized air supply line 47 leading from the air compressor to the air brakes 25, just upstream the pedal-operated air-brake control valve 53 of said air brakes 25. In this manner, the braking force allowed by the vehicle operator can never exceed the pressure allowed by the control valve 51 in the line 47, which pressure is proportional to force carrying the load in the balloons 23.

Although, in the above description of a preferred embodiment of the invention, reference has been made to the front wheels suspension as a "main" suspension whose load is to be controlled, the invention as claimed hereinafter is of broader application. Indeed, use could also be made of the rear suspension or of any intermediate suspension in the case of multiaxles vehicle as "main" suspension, the basic aim of the invention being exclusively to balance the weight over the axles.

Although in the above description and appended claims, reference has been made exclusively to air-inflatable balloons supplied by an air compressor, the invention is intended also to encompass any similar suspension using another fluid instead of air.

I claim:

1. A load distribution system for a road vehicle, said system comprising:
   a main suspension;
   an auxiliary-wheels suspension including air inflatable balloons;
   an air compressor for feeding pressure air to said balloons;
   a weight sensor operatively connected to said main suspension, said sensor being capable of constantly measuring the weight carried by said main suspension and sending corresponding signals;
   a programmed computer connected to said sensor to receive said weight signal, said computer being programmed to compare said weight signals to a preselected weight to be carried by said main suspension and to establish weight variations therefrom; and
   a control assembly for controlling the auxiliary-wheels suspension, said control assembly comprising lifting and lowering means for moving the wheels of said auxiliary-wheels suspension between a ground-engaging position and a retracted position of said wheels under control of said computer, said control assembly also comprising an air pressure controller operatively connected to said balloons of said auxiliary-wheels suspension, to said computer, and to said air compressor for feeding pressurized air received from said air compressor to said balloons of said auxiliary-wheels suspension under control of said computer;

wherein said computer is programmed for responding to said weight variations and for moving said control assembly to move the wheels of said auxiliary-wheels suspension to their ground-engaging position and to adjust the air pressure in said balloons of said auxiliary wheels suspension to a value commensurate to the weight variations established by said computer in order to let the auxiliary-wheels suspension carry any extra weight which exceeds the preselected weight to be carried by said main suspension.

2. A system as claimed in claim 1, wherein said lifting and lowering means are hydraulically operated.

3. A system as claimed in claim 1, wherein said lifting and lowering means are pneumatically actuated through pressurized air received from said air compressor.

4. A system as claimed in claim 1, wherein said main suspension includes air inflatable balloons, and said weight sensor is a pressure transducer connected to at least one of said balloons of said main suspension.

5. A system as claimed in claim 1, wherein said main suspension includes air inflatable balloons and said weight sensor is a pressure transducer connected to one of said balloons of said main suspension.

6. A system as claimed in claim 1, wherein said weight sensor includes means for evaluating the effective load carried by the vehicle and means for calculating its distribution over the axles.

7. A load distribution system for a road vehicle, said system comprising;
  a main suspension;
  an auxiliary-wheels suspension including air inflatable balloons;
  auxiliary wheels mounted on said auxiliary-wheels suspension;
  air brakes for said auxiliary wheels;
  an air compressor for feeding pressure air to said balloons;
  a weight sensor operatively connected to said main suspension, said sensor being capable of constantly measuring the weight carried by said main suspension and sending corresponding signals;
  a programmed computer connected to said sensor to receive said weight signals, said computer being programmed to compare said weight signals to a preselected weight to be carried by said main suspension and to establish weight variations therefrom;
  a control assembly for controlling the auxiliary-wheels suspension, said control assembly comprising lifting and lowering means for moving the wheels of said auxiliary-wheels suspension between a ground-engaging position and a retracted position of said wheels under control of said computer, said control assembly also comprising an air pressure controller operatively connected to said balloons of said auxiliary-wheels suspension, to said computer, and to said air compressor for feeding pressurized air received from said air compressor to said balloons of said auxiliary-wheels suspension under control of said computer; and
  means for feeding pressurized air to said air brakes at a pressure proportional to that of the pressure fed to said balloons of said auxiliary-wheels suspension;
  wherein said computer is programmed for responding to said weight variations and for moving said control assembly to move the wheels of said auxiliary-wheels suspension to their ground-engaging position and to adjust the air pressure in said balloons of said auxiliary-wheels suspension to a value commensurate to the weight variations established by said computer in order to let the auxiliary-wheels suspension carry any extra weight which exceeds the preselected weight to be carried by said main suspension.

8. A load distribution system for a road vehicle, said system comprising:
  a main suspension;
  an auxiliary-wheels suspension including air inflatable balloons;
  auxiliary wheels mounted on said auxiliary-wheels suspension;
  air brakes for said auxiliary wheels;
  an air compressor for feeding pressurized air to said balloons;
  a weight sensor operatively connected to said main suspension, said sensor being capable of constantly measuring the weight carried by said main suspension and sending corresponding signals;
  a programmed computer connected to said sensor to receive said weight signals, said computer being programmed to compare said weight signals to a preselected weight to be carried by said main suspension and to establish weight variations therefrom;
  a control assembly for controlling the auxiliary-wheels suspension, said control assembly being monitored by said computer and operatively connected to said air compressor and to said balloons of said auxiliary-wheels suspension in order to receive pressurized air from said compressor and feed it to said balloons of said auxiliary-wheels suspension; and
  means for feeding pressurized air to said air brakes at a pressure proportional to that of the pressure fed to said balloons of said auxiliary-wheels suspension;
  wherein said computer is programmed for responding to said weight variations and for monitoring said control assembly to correspondingly adjust the air pressure in said balloons of said auxiliary-wheels suspension in order to let the auxiliary suspension carry any extra weight which exceeds the preselected weight to be carried by said main suspension.

9. A system as claimed in claim 8, wherein said balloons of said auxiliary suspension are connected to said control assembly by piping means and said air pressure feeding means comprise:
  a control valve connected to said piping means for receiving pressurized air therefrom at the same pressure as that in said auxiliary-wheels suspension balloons and allowing air to be fed from another source to the brakes at a pressure proportional to said pressure; and
  a pedal-operated air brake control valve mounted in between said control valve and said air brakes.

10. A system as claimed in claim 9, wherein said control assembly comprises an air pressure controller operatively connected to said balloons of said auxiliary-wheels suspension, to said computer and to said air compressor for feeding pressurized air to said balloons under control of said computer.

11. A system as claimed in claim 10, wherein said control assembly comprises lifting and lowering means for moving the wheels of said auxiliary-wheels suspension between a ground-engaging position of the wheels thereof and a retracted position.

12. A system as claimed in claim 11, wherein said road vehicle has a steering wheels suspension and said main suspension is said steering wheels suspension.

13. A system as claimed in claim 11, wherein said main suspension includes air inflatable balloons and said weight sensor is a pressure transducer connected to at least one of said balloons of said main suspension.

14. A system as claimed in claim 9, wherein said control assembly comprises lifting and lowering means for moving the wheels of said auxiliary-wheels suspension between a ground-engaging position of the wheels thereof and a retracted position.

15. A system as claimed in claim 9, wherein said road vehicle has a steering wheels suspension and said main suspension is said steering wheels suspension.

16. A system as claimed in claim 8, wherein said road vehicle has a steering wheels suspension and said main suspension is said steering wheels suspension.

17. A load distribution system for a road vehicle, said system comprising:
   a main suspension;
   an auxiliary-wheels suspension including air inflatable balloons;
   an air compressor for feeding pressurized air to said balloons;
   a weight sensor operatively connected to said main suspension, said sensor being capable of constantly measuring the weight carried by said main suspension and sending corresponding signals;
   a programmed computer connected to said sensor to receive said weight signals, said computer being programmed to compare said weight signals to a preselected weight to be carried by said main suspension and to establish weight variations therefrom; and
   a control assembly for controlling the auxiliary-wheels suspension, said control assembly comprising an air pressure controller operatively connected to said balloons of said auxiliary-wheels suspension, to said computer, and to said air compressor for feeding pressurized air received from said air compressor to said balloons of said auxiliary-wheels suspension under control of said computer;
   wherein said computer is programmed to respond to said weight variations and to monitor said control assembly to adjust the air pressure in said balloons of said auxiliary-wheels suspension to a value commensurate to the weight variations established by said computer in order to let the auxiliary-wheels suspension carry only any extra weight which exceeds the preselected weight to be carried by said main suspension.

18. A system as claimed in claim 17, wherein said road vehicle has a steering wheels suspension and said main suspension is said steering wheels suspension.

19. A system as claimed in claim 18, wherein said main suspension includes air inflatable balloons and said weight sensor is a pressure transducer connected to at least one of said balloons of said main suspension.

20. A load distribution system for a road vehicle, said system comprising:
   a main suspension comprising a steering wheels suspension;
   an auxiliary-wheels suspension including air inflatable balloons;
   an air compressor for feeding pressure air to said balloons;
   a weight sensor operatively connected to said main suspension, said sensor being capable of constantly measuring the weight carried by said main suspension and sending corresponding signals;
   a programmed computer connected to said sensor to receive said weight signals, said computer being programmed to compare said weight signals to a preselected weight to be carried by said main suspension and to establish weight variations therefrom; and
   a control assembly for controlling the auxiliary-wheels suspension, said control assembly comprising lifting and lowering means for moving the wheels of said auxiliary-wheels suspension between a ground-engaging position and a retracted position of said wheels under control of said computer, said control assembly also comprising an air pressure controller operatively connected to said balloons of said auxiliary-wheels suspension, to said computer, and to said air compressor for feeding pressurized air received from said air compressor to said balloons of said auxiliary-wheels suspension under control of said computer;
   wherein said computer is programmed for responding to said weight variations and for moving said control assembly to move the wheels of said auxiliary-wheels suspension to their ground-engaging position and to adjust the air pressure in said balloons of said auxiliary wheels suspension to a value commensurate to the weight variations established by said computer in order to let the auxiliary-wheels suspension carry any extra weight which exceeds the preselected weight to be carried by said main suspension.

* * * * *